June 17, 1924.
J. MESSMER
FAUCET
Filed Aug. 30, 1920
1,497,928
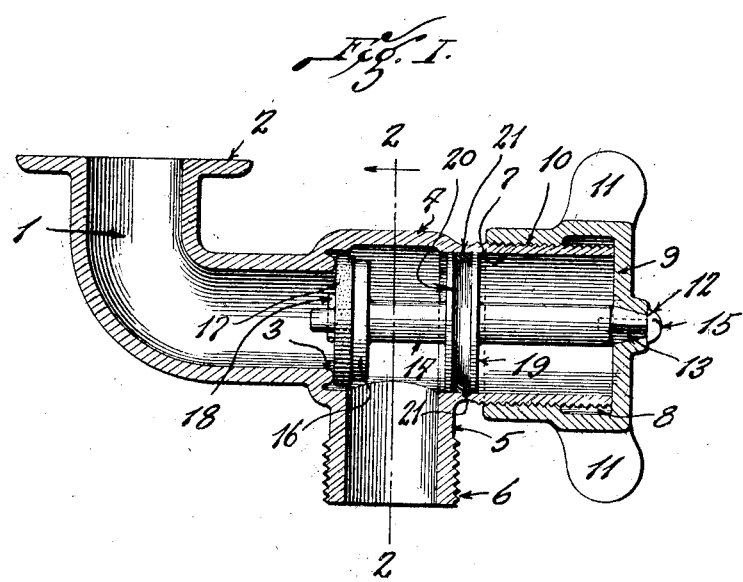
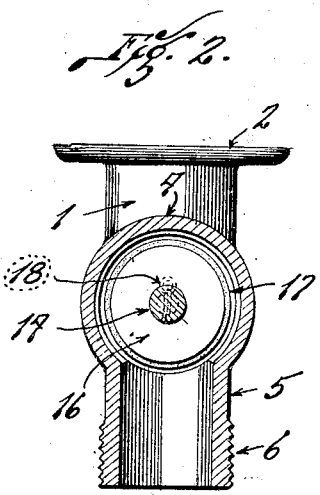
Inventor
Joseph Messmer
by Rippey & Kingland Attys.

Patented June 17, 1924.

1,497,928

UNITED STATES PATENT OFFICE.

JOSEPH MESSMER, OF KIRKWOOD, MISSOURI, ASSIGNOR TO FERD MESSMER MANUFACTURING COMPANY, OF ST. LOUIS, MISSOURI, A CORPORATION OF MISSOURI.

FAUCET.

Application filed August 30, 1920. Serial No. 406,948.

*To all whom it may concern:*

Be it known that I, JOSEPH MESSMER, a citizen of the United States, residing at Kirkwood, St. Louis County, Missouri, have invented a new and useful Faucet, of which the following is a specification.

This invention relates to improvements in faucets, and consists in the novel construction hereinafter described.

An object of the invention is to provide a faucet particularly adapted as a drain cock for washing machines, oil tanks, or containers of a like character, where the faucet is likely to become clogged necessitating provision for cleaning out the faucet at intervals.

Another object of the invention is to provide a faucet of the character mentioned having a discharge spout and a clean-out opening, with provision for regulating the flow through the faucet and for preventing leakage of fluid into the clean-out passage.

Another object of the invention is to generally simplify the construction of faucets of the class described, thereby reducing the cost of manufacture and of assembly.

Additional advantages of the invention will be apparent from the following detailed description thereof taken in connection with the accompanying drawing, in which—

Fig. 1 is a vertical section illustrating the construction of the faucet.

Fig. 2 is a cross section taken on the line 2—2 of Fig. 1.

In the embodiment of the invention illustrated in the drawing the faucet comprises a body formed preferably from a single casting and including an inlet chamber formed from an elbow 1 and having a flange 2 surrounding the inlet opening, whereby the faucet may be attached to the container. The inlet opening registers with a discharge opening in the container (not shown). At the effluent end of the elbow 1 is a rounded bead or extension 3 which constitutes a valve seat for cooperation with the fluid regulating and controlling valve. The faucet body further includes a valve chamber 4 of a diameter slightly in excess of the diameter of the elbow 1, the elbow 1 discharging directly into the valve chamber.

A discharge spigot 5 communicates with the valve chamber 4 and extends downwardly approximately at right angles thereto, the discharge spigot being provided with exterior threads 6 whereby a discharge tube or hose may be connected directly to the spigot.

In longitudinal prolongation of the valve chamber a clean-out chamber 7 is provided. The cleanout chamber 7 is of slightly less diameter than the valve chamber and has a smooth cylindrical inner surface and a threaded exterior surface 8. A cap 9 internally threaded at 10 is adapted to be threaded over the clean-out chamber and is provided with wings 11 for manual manipulation, whereby it may be moved longitudinally of the clean-out chamber. The head of the cap 9 is provided with a tapering polygonal recess 12 which constitutes a socket for a complementarily formed end 13 of a stem 14, the end of the stem 14 having a threaded opening to receive a screw 15 whereby the stem is removably attached to the head of the cap. The stem 14 has a disc 16 integrally formed therewith and disposed adjacent to its inner end. A fibre disc 17 constituting a valve closure is fitted over the end of the stem 14 projecting beyond the disc 16 and is removably held in place by a cotter pin 18 that extends through an opening in the stem. The disc 17 is of a diameter in excess of the diameter of the effluent end of the elbow 1 so that the disc may seat against the bead or extension 3 of the elbow, whereby the flow from the effluent end of the elbow may be controlled.

A plunger 19 in the form of a circular disc having a groove 20 in its periphery is integrally formed with the stem 14 and disposed at a position thereon so that the plunger will ride against the interior surface of the clean-out chamber 7.

Packing material 21 is seated in the groove 20 so that a tight joint is formed between the plunger and the clean-out chamber thereby preventing leakage of the liquid into the clean-out chamber when the valve is open.

It will be observed that by rotating the cap 9 the valve may be moved toward and away from the valve seat and, as an incident thereto, the plunger will move in the clean-out chamber maintaining at all times a seal between the clean-out chamber and the valve chamber. It will be observed that by unscrewing the cap the entire valve mechanism may be removed so that free access may be attained through the valve for removing any accumulated substances therein without difficulty.

I am aware that the invention may be modified in certain particulars without departing from the spirit and scope thereof, and I do not limit myself therefore to the exact construction shown and described.

What I claim and desire to secure by Letters Patent, is:—

In a faucet, a body composed of a casting having an inlet passage, a valve chamber formed in longitudinal prolongation of the inlet passage integrally united with the wall of said passage, an integral annular extension of the wall of said passage extending into said valve chamber, a discharge spigot integral with said chamber and opening into said chamber a distance from the end of said extension, a clean out chamber formed in longitudinal prolongation of the valve chamber; a valve stem; a removable valve disc of less diameter than the diameter of the valve chamber carried by said stem and arranged to seat against the end of said extension; a pressure disc on said stem bearing against the valve disc and being of less diameter than the valve disc; a packing disc of larger diameter than said valve disc supported by the stem and at all times closing communication from the spigot to the clean out chamber behind said packing disc, said packing disc being movable in the clean out chamber for preventing the flow of liquid from the valve chamber into the clean out chamber when the valve is open, and means for operating said stem to open and close the valve.

JOSEPH MESSMER.